(12) United States Patent
Zeng et al.

(10) Patent No.: US 11,258,792 B2
(45) Date of Patent: Feb. 22, 2022

(54) METHOD, DEVICE, SYSTEM FOR AUTHENTICATING AN ACCESSING TERMINAL BY SERVER, SERVER AND COMPUTER READABLE STORAGE MEDIUM

(71) Applicant: SHENZHEN UCLOUDLINK NEW TECHNOLOGY CO., LTD., Shenzhen (CN)

(72) Inventors: Xiangshun Zeng, Shenzhen (CN); Jingbing Chen, Shenzhen (CN)

(73) Assignee: SHENZHEN UCLOUDLINK NEW TECHNOLOGY CO., LTD., Shenzhen (CN)

( * ) Notice: Subject to any disclaimer, the term of this patent is extended or adjusted under 35 U.S.C. 154(b) by 259 days.

(21) Appl. No.: 16/699,529

(22) Filed: Nov. 29, 2019

(65) Prior Publication Data

US 2020/0106775 A1 Apr. 2, 2020

Related U.S. Application Data

(63) Continuation-in-part of application No. PCT/CN2018/094515, filed on Jul. 4, 2018.

(30) Foreign Application Priority Data

Jul. 28, 2017 (CN) .......................... 201710630063.9

(51) Int. Cl.
*H04L 29/06* (2006.01)
*H04L 9/08* (2006.01)
*H04L 9/32* (2006.01)

(52) U.S. Cl.
CPC ........ *H04L 63/0876* (2013.01); *H04L 9/0838* (2013.01); *H04L 9/0869* (2013.01); *H04L 9/3247* (2013.01)

(58) Field of Classification Search
CPC . H04L 63/0876; H04L 9/0838; H04L 9/0869; H04L 9/3247; H04L 63/08; H04W 12/03; H04W 12/71; H04W 12/06
See application file for complete search history.

(56) References Cited

U.S. PATENT DOCUMENTS

2007/0143834 A1* 6/2007 Leinonen ............. H04L 63/205
    726/5
2009/0328182 A1* 12/2009 Malakapalli ........ H04L 63/0838
    726/11

(Continued)

FOREIGN PATENT DOCUMENTS

| CN | 102270287 A | 12/2011 |
|---|---|---|
| CN | 102957951 A | 3/2013 |
| CN | 104639640 A | 5/2015 |

*Primary Examiner* — Sher A Khan
(74) *Attorney, Agent, or Firm* — Robert L. Stearns; Dickinson Wright, PLLC

(57) ABSTRACT

The present disclosure is applied to the field of communication technology, and provides a method, device for authenticating an accessing terminal and a system. The method includes: receiving a connection request sent by the terminal, the connection request carrying first terminal operation information; obtaining pre-stored second terminal operation information, and matching the first terminal operation information with the pre-stored second terminal operation information according to a preset matching strategy; sending, when the terminal operation information matches the pre-stored second terminal operation information, authentication success information to the terminal, and establishing communication with the terminal.

16 Claims, 9 Drawing Sheets

(56) References Cited

U.S. PATENT DOCUMENTS

| | | | | |
|---|---|---|---|---|
| 2010/0132017 | A1* | 5/2010 | Robinson | H04L 63/08 |
| | | | | 726/5 |
| 2013/0046976 | A1* | 2/2013 | Rosati | H04W 12/069 |
| | | | | 713/168 |
| 2013/0339740 | A1* | 12/2013 | Ben-Shalom | H04L 63/205 |
| | | | | 713/175 |
| 2015/0106897 | A1* | 4/2015 | Davis | G06F 21/32 |
| | | | | 726/7 |
| 2015/0128205 | A1* | 5/2015 | Mahaffey | H04L 63/105 |
| | | | | 726/1 |
| 2016/0050203 | A1* | 2/2016 | Hefetz | H04L 63/0853 |
| | | | | 726/7 |
| 2016/0087957 | A1* | 3/2016 | Shah | H04L 63/08 |
| | | | | 726/1 |
| 2017/0094510 | A1* | 3/2017 | Khosravi | G06F 21/72 |
| 2019/0260737 | A1* | 8/2019 | Brown | G06Q 20/40145 |

* cited by examiner

METHOD, DEVICE, SYSTEM FOR AUTHENTICATING AN ACCESSING TERMINAL BY SERVER, SERVER AND COMPUTER READABLE STORAGE MEDIUM

CROSS REFERENCE TO RELATED APPLICATION

This application is a continuation-in-part application of PCT Patent Application Ser. No. PCT/CN2018/094515, filed on Jul. 4, 2018, which claims priority to Chinese Patent Application Ser. No. 201710630063.9 filed on Jul. 28, 2017, the entire disclosures of which are incorporated herein by reference in its entirety.

TECHNICAL FIELD

The present disclosure relates to the field of communication technology, and particularly to method, device, system for authenticating an accessing terminal by server, server and computer readable storage medium.

BACKGROUND

With the development of science and technology, more and more terminals, including devices, such as M2M or the like, for the Internet of Things, need to be connected to remote servers via the internet to provide services to users. However, after the data sources are transmitted via the network, there may be various forgery. The accessing terminal may be a legitimate terminal, or it may only be a host program that forges legitimate communication data. Therefore, in order to ensure that the accessing terminal is a legitimate terminal, the remote server often needs to authenticate the terminals that request access so as to further provide services to them.

Currently, when authenticating a terminal, authentication is usually performed in the following methods. In the first method, an unique identification code of device, such as IMEI, is used for authentication. However, the IMEI protection mechanism of manufacturers is unreliable, and could be easily read and modified. In the second method, some key data is preset into the products before the products leave the factory. For example, the key is preset into the terminal based on the PKI infrastructure to complete the authentication. In this way, it needs to preset key in each terminal before the terminal leaves the factory, which renders the cost too high. Since the terminal may be produced by a third-party manufacturer, the introduction of the key may increase the risk of data leakage and cost. Moreover, in the life cycle of the terminal, as the key may be lost because the key is not well-protected (for example, the user chooses factory reset in the smart phone), the situation that the service cannot be used or can only be returned to the factory for repair may happens, which brings the manufacturer great loss.

Therefore, the authentication of accessing terminal performed according to the above methods, is in low reliability in actual operation, and is easy to be read and modified, which has the risk of data leakage.

SUMMARY

An embodiment of the disclosure provides a method for authenticating an accessing terminal by a server, which aims to solve the problem of low reliability, easy to be read and modified, and the data leakage risk in the prior art.

In a first aspect, an embodiment of the present disclosure provides a method for authenticating an accessing terminal by a server, which is applied to a server, wherein the method includes:

receiving a connection request sent by the terminal, wherein the connection request carries terminal operation information;

obtaining pre-stored terminal operation information, and matching the terminal operation information with the pre-stored terminal operation information according to a preset matching strategy, wherein the terminal operation information includes one or any combination of process information, code segment hash, stack feature information, or application signature information; and sending, when the terminal operation information matches the pre-stored terminal operation information, authentication success information to the terminal, and establishing communication with the terminal.

In a second aspect, an embodiment of the present disclosure provides a device for authenticating an accessing terminal by a server, wherein the device is applied to a server, and the device includes:

a connection request receiving unit, configured to receive a connection request sent by the terminal, wherein the connection request carries terminal operation information;

a matching unit, configured to obtain pre-stored terminal operation information, and match the terminal operation information with the pre-stored terminal operation information according to a preset matching strategy, wherein the terminal operation information includes one or any combination of process information, code segment hash, stack feature information or application signature information; and a communication establishing unit, configured to send, when the terminal operation information matches the pre-stored terminal operation information, authentication success information to the terminal, and establish communication with the terminal.

In a third aspect, an embodiment of the present disclosure further provides a system for authenticating an accessing terminal by a server, including:

a terminal, configured to obtain terminal operation information, and send the terminal operation information to a server; and a server configured to receive the terminal operation information sent by the terminal, and perform legality authentication on the terminal according to the terminal operation information;

the server includes:
  a connection request receiving unit, configured to receive a connection request sent by the terminal, wherein the connection request carries terminal operation information;
  a matching unit, configured to obtain pre-stored terminal operation information, and match the terminal operation information with the pre-stored terminal operation information according to a preset matching strategy; and
  a communication establishing unit, configured to send, when the terminal operation information matches the pre-stored terminal operation information, authentication success information to the terminal, and establish communication with the terminal.

In a fourth aspect, an embodiment of the present disclosure further provides a server, which includes:

a processor, configured to implement the steps of the method according to the first aspect when executing a computer program stored in a memory.

In a fifth aspect, an embodiment of the present disclosure further provides a computer readable storage medium with a computer program (instruction) stored thereon, wherein when the computer program (instruction) is executed by a processor, the steps of the method according to the first aspect are implemented.

In an embodiment of the present disclosure, the server receives the connection request which carries terminal operation information and is sent by the terminal, and the server detects, by using a preset matching strategy, whether the terminal operation information of the terminal matches the pre-stored terminal operation information, and allows, when the terminal operation information matches the pre-stored terminal operation information, the terminal to access so as to communicate with the server. Since the terminal operation information is not easy to be read and modified, the access of a host program that forged the legitimate communication data can effectively be avoided by detecting terminal operation information, which is very safe and reliable. Further, as the terminal operation information is detected by using a preset matching strategy, the legitimacy of the terminal can be detected in various aspects, which has pertinence, the reliability is higher, and data leakage risk can be avoided.

BRIEF DESCRIPTION OF THE DRAWINGS

Other advantages of the embodiments of present invention will be readily appreciated, as same becomes better understood by reference to the following detailed description when considered in connection with the accompanying drawings wherein.

DESCRIPTION OF THE ENABLING EMBODIMENT

The present disclosure will be further described in detail below with reference to the accompanying drawings and embodiments to make the objective, technical proposal and advantages of present disclosure clearer. It is understood that the specific embodiments described herein are merely illustrative of the present disclosure and are not intended to limit the present disclosure.

In an embodiment of the present disclosure, the server receives the connection request carrying terminal operation information and sent by the terminal, and the server detects, by using a preset matching strategy, whether the terminal operation information of the terminal matches the pre-stored terminal operation information, and allows, when the terminal operation information matches the pre-stored terminal operation information, the terminal to access so as to communicate with the server. Since the terminal operation information is not easy to be read and modified, the access of a host program that forged the legitimate communication data can effectively be avoided by detecting terminal operation information, which is very safe and reliable. Further, as the terminal operation information is detected by using a preset matching strategy, the legitimacy of the terminal can be detected in various aspects, which has pertinence, the reliability is higher, and data leakage risk can be avoided.

Figure 1:
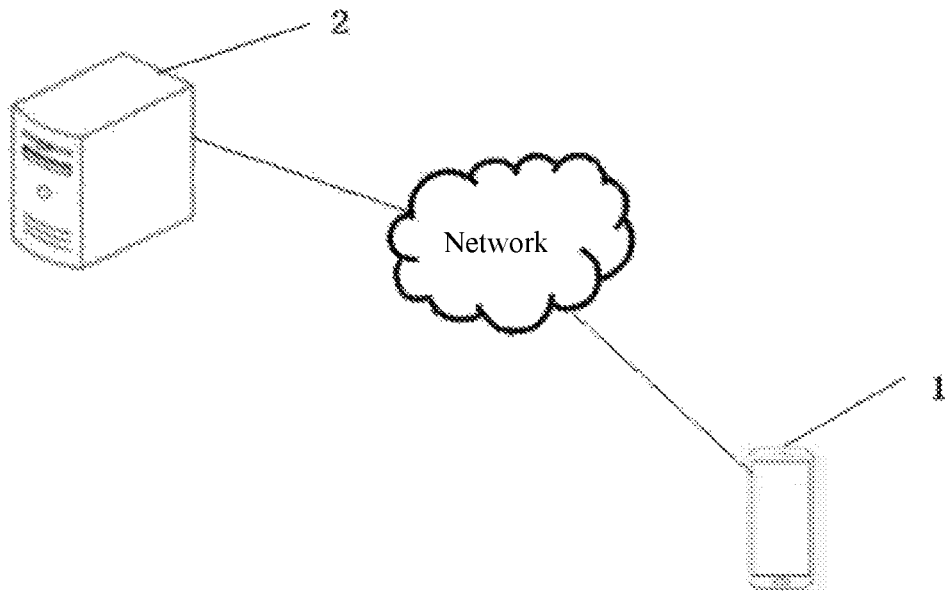
FIG. 1 illustrates a scenario schematic diagram of a system for authenticating an accessing terminal by a server according to an embodiment of the present disclosure.

FIG. 1 illustrates a scenario schematic diagram of a system for authenticating an accessing terminal by a server according to an embodiment of the present disclosure. For convenience of explanation, only parts relating to this embodiment of the present disclosure are shown.

Referring to FIG. 1, the server 2 can make communication with at least one terminal 1 through a network. The terminal 1 sends a connection request carrying terminal authentication information to the server through the network. The server 2 receives the connection request, obtains the pre-stored terminal operation, invokes the corresponding matching strategy, and matches the terminal operation information with the pre-stored terminal operation information. When terminal operation information matches with the pre-stored terminal operation information, communication establishing information is sent to terminal. At this time, the terminal 1 communicates with the server 2 and terminal access is implemented.

In an embodiment of the present disclosure, the identification information is identification name or identification code, which is used to uniquely identify the same terminal 1.

In an embodiment of the present disclosure, the network may be a LAN (Local Area Network), a WAN (Wide Field Network), a wireless network, a point-to-point network, a star network, a Token Ring network, a network hub network, or other configurations, which are not limited in the present disclosure. The terminal may be a personal computer (PC), a notebook computer, a personal digital assistant (PDA), a mobile phone, and the like.

Embodiment 1

Figure 2:
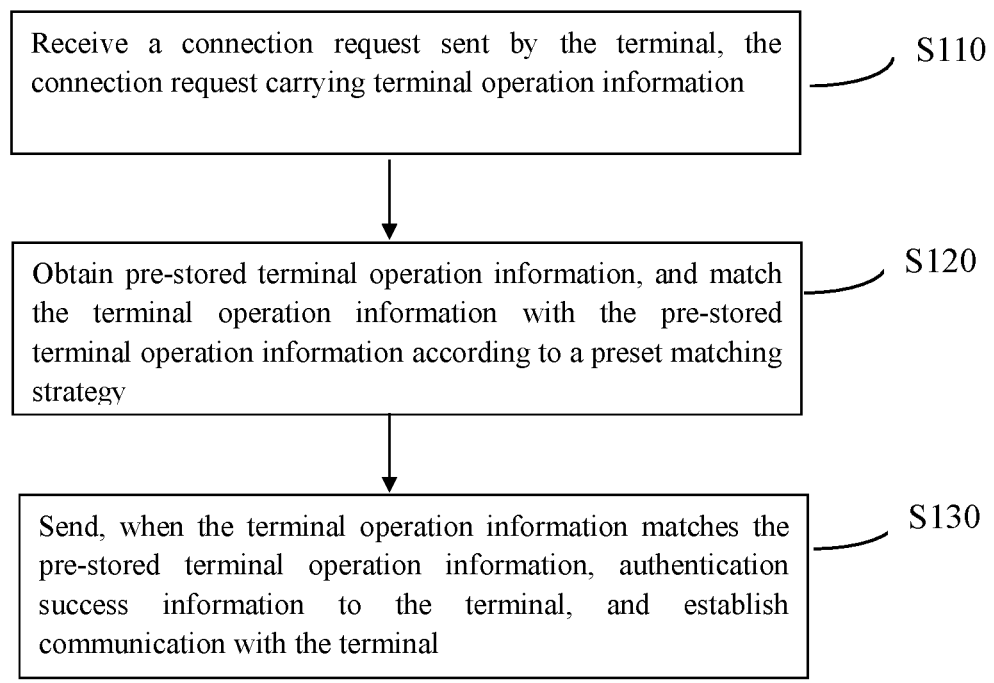
FIG. 2 illustrates a flowchart of the implementation of the method for authenticating an accessing terminal by a server according to Embodiment 1 of the present disclosure.

FIG. 2 illustrates a flowchart of the implementation of the method for authenticating an accessing terminal by a server according to Embodiment 1 of the present disclosure, which is applied to a server, and is described in detail as following steps S110, S120 and S130.

In step S110, a connection request sent by the terminal is received, and the connection request carries terminal operation information.

In an embodiment of the present disclosure, the terminal operation information includes one or any combination of the process information, the code segment hash, the stack feature information, or the application signature information.

In an embodiment of the present disclosure, the process information includes but not limited to the creator, the authority, the debugging information, the opened file and socket list, the process ID, the parent process ID, the assigned user ID, the group ID, the belonged user group list, the owned capacity, capability, list of Android capabilities for APP applications. When the terminal collects process information, it can be performed by, for example, reading the information of /proc/self/status in the Android system or checking whether the parent process ID (PPID) is the desired caller process ID. Receiving the ID of the process tracking the process information (Trace PID) can indicate whether the process is in the debugged state. The user ID (UID) and the group ID can indicate whether the process has been assigned with the appropriate user ID and user group, and the capability of the process (CapEff), etc. can indicate whether the ability acquired by the current process is appropriate.

In the embodiment of the present disclosure, the code segment hash can be obtained by program, for example, obtained by calculating using a hash algorithm for .text segments of all executable files.

In the embodiment of the present disclosure, the stack information may be obtained by following ways. For example, the terminal may, before sending the stack information to the server, set a random number in a local variable in the stack, transmit the address of the random number to the function of collecting the stack, then collect the data, which is stack information, between the stack address of the function and the address of the random number through the function. The random number can be set in a plurality of function stacks existing hierarchical calling relationship. However, the premise of above is that the collection to the function stacks set in the function execution does not end.

The random number may be generated by the terminal or may be the random number sent by the server.

In step S120, the pre-stored terminal operation information is acquired, and the terminal operation information and the pre-stored terminal operation information are matched according to a preset matching strategy.

In an embodiment of the present disclosure, the pre-stored terminal operation information is the terminal operation information stored in the authentication database of the server. As the process information collected by different types of terminals is in different modes but the process information of the same type of terminal is basically the same, each type of terminal process information can be entered into the authentication database for storage before the products are shipped. The same type of terminals can be the terminals with the same operating system, the same brand, and the same model.

In an embodiment of the present disclosure, the preset matching strategy is preset by the server system, or may be sent by the strategy server.

In the embodiment of the present disclosure, the preset matching strategy is to match all the received terminal operation information with the preset terminal operation information, or select at least one terminal operation information sent by the terminal to match with the preset terminal operation information.

In the embodiment of the present disclosure, when receiving the terminal operation information sent by the terminal, the server may perform authentication detection between the terminal operation information and the terminal operation information pre-stored in the authentication database by using a regular expression. Specifically, the regular expression is generated according to the terminal operation information pre-stored in the database and the matching rule list is set up according to the rule of the regular expression. the matching of the terminal operation information is sequentially performed according to the order of the fields of the regular expression. When the matching of the fields in the regular expression is successfully, the terminal operation information is detected successfully and the terminal can access legally. Otherwise, the detection fails and the terminal access fails.

In a preferred embodiment of the present disclosure, the terminal can set an authentication code in the stack, and the server protects the memory of the stack according to the distribution of the authentication code, so as to avoid others' unauthorized access by utilizing the available bug of the buffer overflow during authentication phase. Specifically, multiple authentication codes are set in the stack. For example, the authentication codes are set in the function stacks of the hierarchical function call relationship, and the authentication codes in the shallow-level function stack that has not been recovered are traversed by the deep-level function and the address differences between every two random numbers in each function are calculated. According to the calling relationship of the functions reflected by the address differences, as the calling relationship is certain, when one of the functions is attacked, the sum of the random numbers in the function stacks may be destroyed, so the function calling relationship will also be abnormal. Therefore, it can be determined whether it is currently attacked by others or not by detecting whether the function calling relationship is abnormal, thus protection of the stack memory can be realized.

The authentication code may be random number generated by the terminal, or may be random number sent by the server.

In step S130, when the terminal operation information is matched with the pre-stored terminal operation information, the authentication success information is sent to the terminal, and communication is established with the terminal.

In the embodiment of the present disclosure, the server receives the encrypted terminal operation information sent by the terminal, and performs legality detection of the terminal according to the terminal operation information to determine whether to enable the terminal to access. By encrypting the terminal operation information before transmitting it to the server, the security of the terminal operation information during the transmitting process can be ensured, the attack by others can be avoided and the risk of data leakage can be reduced.

Embodiment 2

Figure 3:
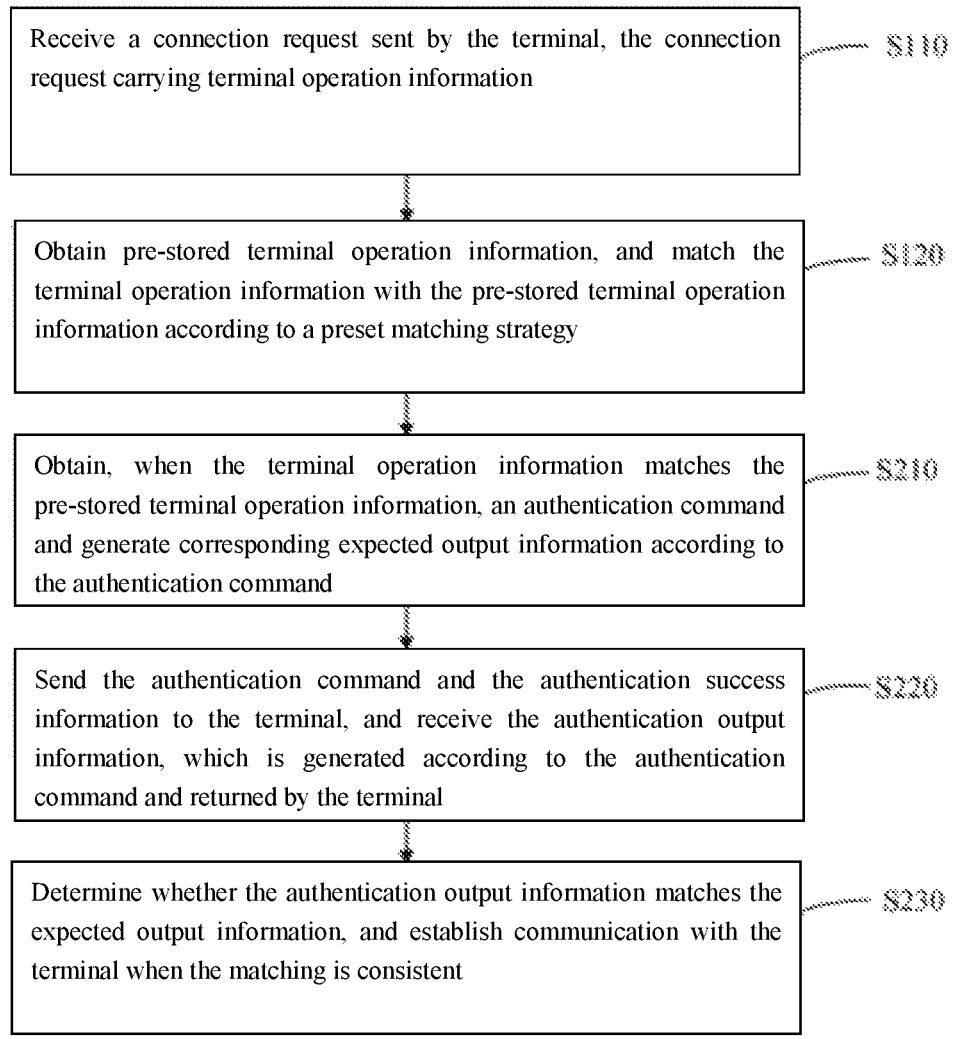
FIG. 3 illustrates a flowchart of the implementation of the method for authenticating an accessing terminal by a server according to Embodiment 2 of the present disclosure.

FIG. 3 illustrates a flowchart of the implementation of the method for authenticating an accessing terminal by a server according to Embodiment 2 of the present disclosure, which is similar to Embodiment 1. The difference is that when the terminal operation information and the pre-stored the terminal operation information are matched with each other, the detection result information is sent to the terminal and communication is established with the terminal, including S210, S220 and S230.

In step S210, when the terminal operation information matches the pre-stored terminal operation information, an authentication command is obtained and corresponding expected output information is acquired according to the authentication command.

In the embodiment of the present disclosure, after the matching of the terminal operation information sent by the terminal and the pre-stored terminal operation information succeeds, the authentication command is obtained, and corresponding expected output information is acquired according to the authentication command. For example, the authentication command is to generate the current process number, and the server will acquire the expected output information according to the authentication command, such as, the current process number is process number A.

The authentication command can be generated by the server. Alternatively, the server sends the authentication success information to the strategy server after the terminal operation information succeeds and receives the authentication command returned by the strategy server.

In the embodiment of the present disclosure, the authentication command may be to obtain the current process number or the parent process number, or the memory address loaded by the process, and may be specifically set according to actual conditions.

In step S220, the authentication command and the authentication success information are sent to the terminal, and the authentication output information, which is generated according to the authentication command, returned by the terminal is received.

In step S230, it is determined whether the authentication output information matches the expected output information, and the authentication output information matches the expected output information, communication is established with the terminal.

In an embodiment of the present disclosure, the expected output information is the corresponding expected output information acquired by the server according to the authentication command when the server sends the authentication command to the terminal. For example, when the authentication command is the current process number, the server obtains the process number in the operation information from the terminal as the expected output information.

In the embodiment of the present disclosure, after the authentication output information is generated according to the authentication command sent by the server, the authentication output information is sent to the server by the terminal, so that the server performs matching on the expected output information according to the authentication output information. If the matching is successful, the terminal is legal, in this case, the server can be accessed. For example, the authentication command is the current process number, the generated authentication output information is the process number A, and the expected output information is also the process number A, then the authentication output information is consistent with the expected output information and the terminal could access to the server.

Embodiment 3

Figure 4:
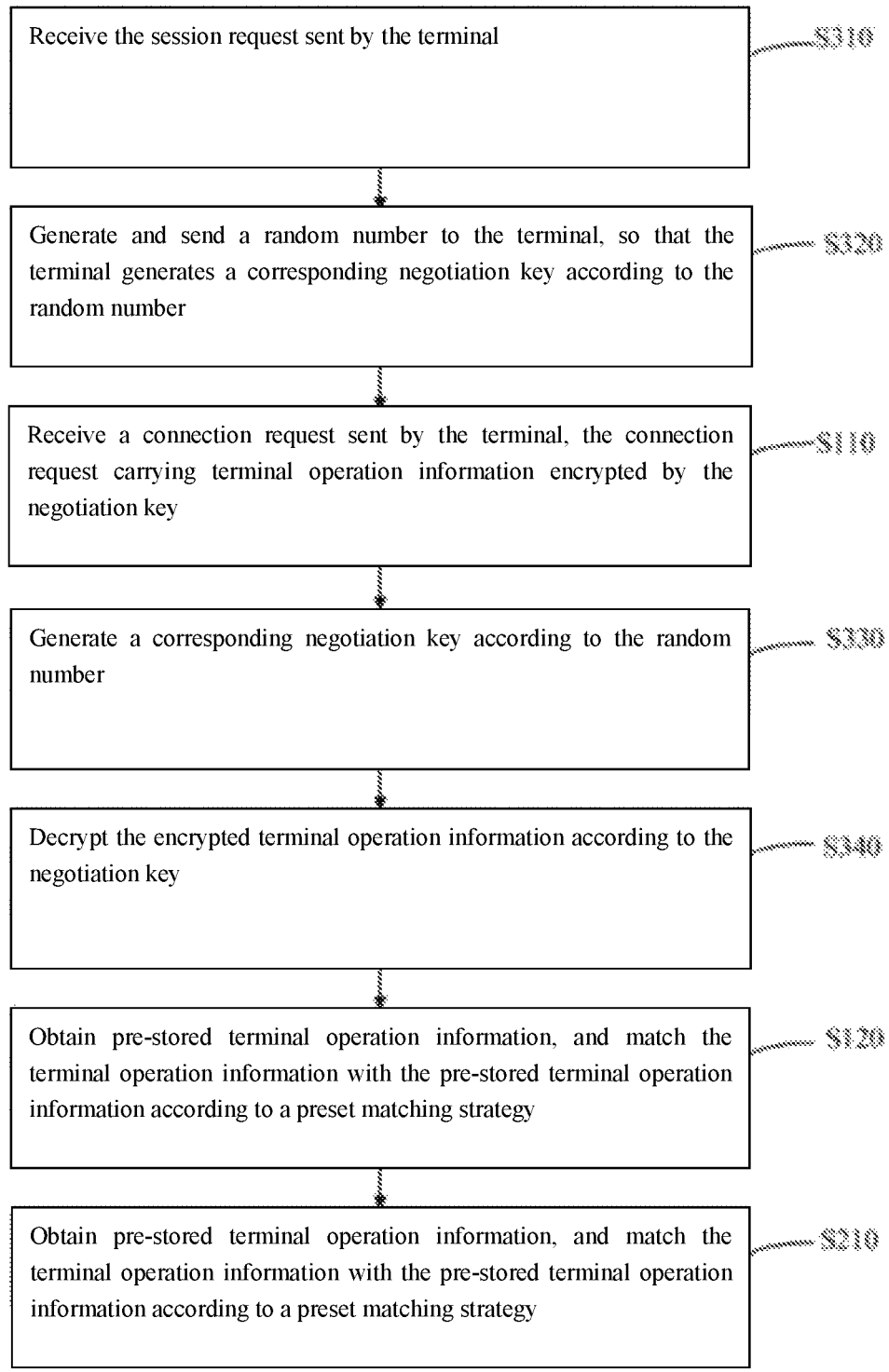
FIG. 4 illustrates a flowchart of the implementation of the method for authenticating an accessing terminal by a server according to Embodiment 3 of the present disclosure.

FIG. 4 illustrates a flowchart of the implementation of the method for authenticating an accessing terminal by a server according to Embodiment 3 of the present disclosure, which is similar to the first embodiment. The difference is that before receiving the connection request sent by the terminal, the connection request carrying the terminal operation information, the method further includes S310 and S320.

In step S310, a session request sent by the terminal is received.

In step S320, a random number is generated and sent to the terminal, so that the terminal generates a corresponding negotiation key according to the random number.

In an embodiment of the present disclosure, when receiving the session request sent by the terminal, the server is triggered to generate a corresponding random number according to the random number generation algorithm and send the corresponding random number to the terminal for generating the negotiation key. The random number generation algorithm may include a plurality of ways, for example, could be Math.random( ), and s could be set according to actual conditions, which is not limited by the present disclosure.

In the embodiment of the present disclosure, the negotiation key can be obtained by the following calculation method: the negotiation key ka=f (random number, IMEI), where IMEI is the international mobile equipment identity, which is the unique code to identify the same terminal device, and f is computational relationship, which can be set according to the actual situation. Based on the negotiation key agreement, negotiation key ka may be obtained through the random number sent by the server, the unique identification code, IMEI, of the terminal device, by the above algorithm formula, using the calculation with two inputs, like "and", "or", etc. The negotiation key agreement can be the Internet Key Exchange Agreement, or IKE for short.

Further, the negotiation key ka can alternatively be calculated by other algorithms, which is not limited in the embodiment of the present disclosure.

The step of receiving a connection request sent by terminal, the connection request carrying terminal operation information, includes S330.

In step S330, a connection request sent by the terminal is received, the connection request carrying terminal operation information encrypted by the negotiation key.

In an embodiment of the present disclosure, the server receives the connection request sent by the terminal, the connection request carrying the terminal operation information, and the server detects, by using a preset matching strategy, whether the terminal operation information of the terminal matches the pre-stored terminal operation information. When the terminal operation information matches the pre-stored terminal operation information, the terminal is allowed to access to communicate with the server. Since the terminal operation information is not easy to be read and modified, the access of a host program that forged the legitimate communication data can effectively be avoided by detecting terminal operation information, which is very safe and reliable. Further, as the terminal operation information is detected by using a preset matching strategy, the legitimacy of the terminal can be detected in various aspects, which has pertinence, the reliability is higher, and data leakage risk can be avoided. In an embodiment of the present disclosure, before obtaining the pre-stored terminal operation information, and matching the terminal operation information with the pre-stored terminal operation information according to a preset matching strategy, the method further includes S340 and S350.

In step S340, the negotiation key is generated according to the random number.

In the embodiment of the present disclosure, the negotiation key can be obtained by the following calculation method: the negotiation key ka=f (random number, IMEI), where IMEI is the international mobile equipment identity, which is the unique code to identify the same terminal device, and f is computational relationship, which can be set according to the actual situation. Based on the negotiation key agreement, negotiation key ka may be obtained through the random number sent by the server, the unique identification code, IMEI, of the terminal device, by the above algorithm formula, using the calculation with two inputs, like "and", "or", etc. The negotiation key agreement can be the Internet Key Exchange Agreement, or IKE for short.

Further, the negotiation key ka can alternatively be calculated by other algorithms, which is not limited in the embodiment of the present disclosure.

In step S350, the encrypted terminal operation information is decrypted according to the negotiation key.

In the embodiment of the present disclosure, after the server generates the random number, a negotiation key is generated according to the random number, and the negotiation key corresponds to the negotiation key generated by the terminal. When receiving the terminal operation information encrypted by the negotiation key and sent by terminal, the server decrypts the terminal operation information according to the generated negotiation key to obtain the decrypted terminal operation information.

Embodiment 4

Figure 5:
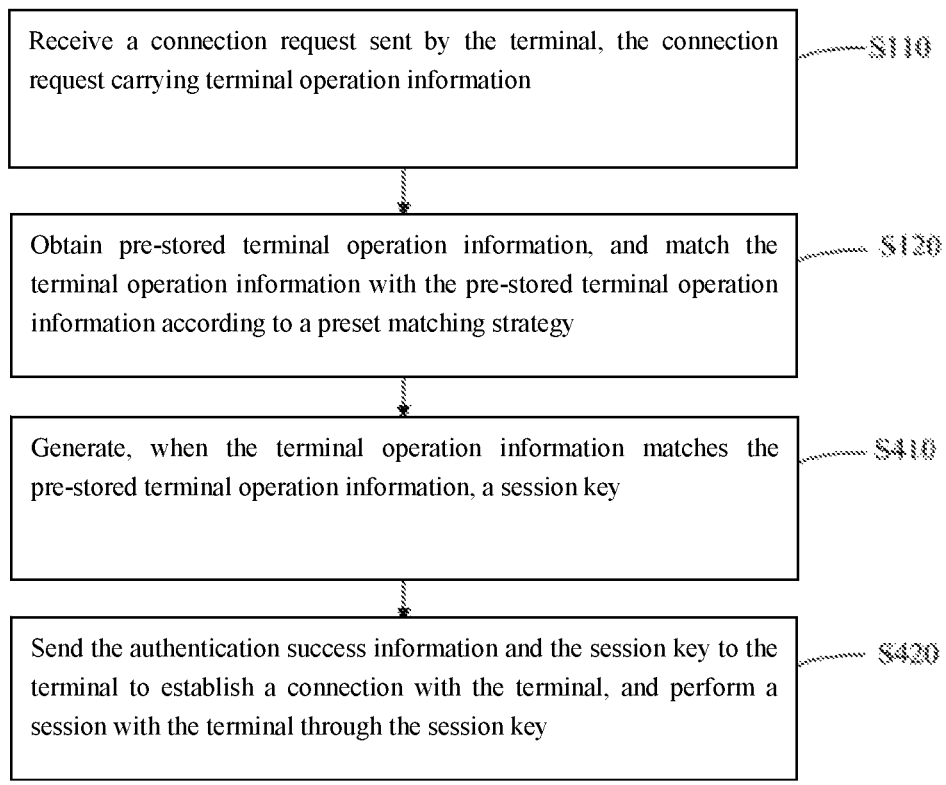
FIG. 5 illustrates a flowchart of the implementation of the method for authenticating an accessing terminal by a server according to Embodiment 4 of the present disclosure.

FIG. 5 illustrates a flowchart of the implementation of the method for authenticating an accessing terminal by a server according to Embodiment 4 of the present disclosure, which is similar to Embodiment 1. However, the difference is that when the detection passes, the detection result information is sent to the terminal and communication with the terminal is established, the method further includes S410 and S420.

In step S410, when the terminal operation information matches the pre-stored terminal operation information, a session key is generated.

In an embodiment of the present disclosure, when the server matches the pre-stored terminal operation information with the terminal operation information sent by the terminal through a preset matching strategy, the session key may be generated, and the session key is encrypted by the negotiation key. The terminal receives the encrypted session key and decrypts it by negotiation key. When the communication is made with the server, it can be encrypted by the session key to ensure safety. The session key can be derived from cluttered signal values using the CryptDeriveKey function.

In an embodiment of the disclosure, the session key may alternatively be replaced directly by the negotiation key.

In step S420, the authentication success information and the session key are sent to the terminal to establish a connection with the terminal, and a session is performed with the terminal through the session key.

In an embodiment of the present disclosure, in order to ensure the security of the session key in the transmission process, the session key may be encrypted by using the negotiation key, and when receives the session key, the terminal may decrypt the session key by negotiation key so that the session key could be used to encrypt the session of the communication process.

In an embodiment of the present disclosure, the server records the interaction time in each of the interaction steps, that is, forms a timestamp. Based on the timestamp, whether the interaction time is too long may be determined, so as to perform corresponding processing in time, for example, stopping the connection process, etc., to prevent the breakpoint debugging of the terminal.

In an embodiment of the present disclosure, the server receives the connection request which carries terminal operation information and is sent by the terminal, and the server detects, by using a preset matching strategy, whether the terminal operation information of the terminal matches the pre-stored terminal operation information, and allows, when the terminal operation information matches the pre-stored terminal operation information, the terminal to access so as to communicate with the server. Since the terminal operation information is not easy to be read and modified, the access of a host program that forged the legitimate communication data can effectively be avoided by detecting terminal operation information, which is very safe and reliable. Further, as the terminal operation information is detected by using a preset matching strategy, the legitimacy of the terminal can be detected in various aspects, which has pertinence, the reliability is higher, and data leakage risk can be avoided.

Embodiment 5

Figure 6:
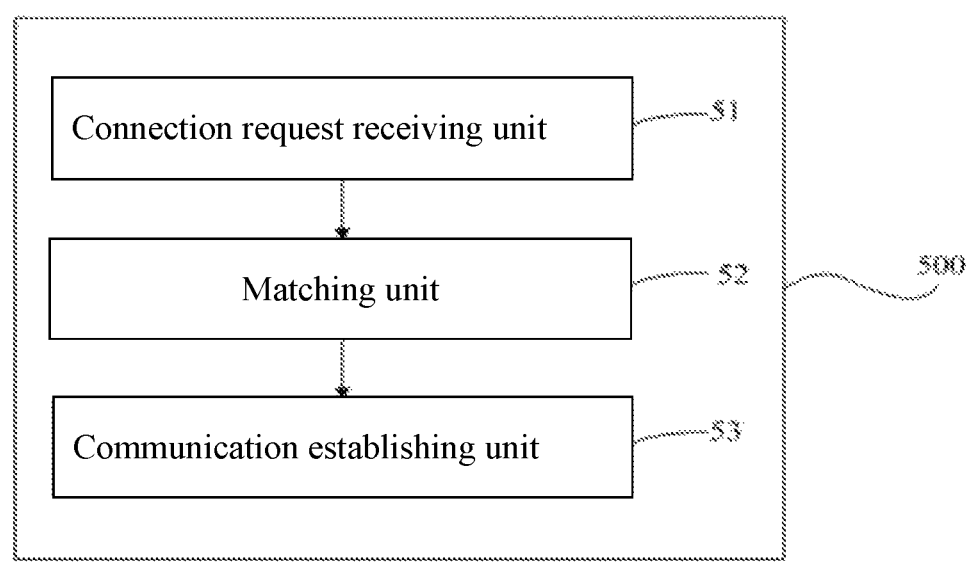
FIG. 6 illustrates a schematic structural diagram of the device for authenticating an accessing terminal by a server according to Embodiment 5 of the present disclosure.

FIG. 6 illustrates the device 500 for authenticating an accessing terminal by a server according to Embodiment 5 of the present disclosure, which is applied to a server. For convenience of description, only parts related to this embodiment of the present disclosure are shown.

The device 500 for authenticating an accessing terminal by a server further includes a connection request receiving unit 51, a matching unit 52, and a communication establishing unit.

The connection request receiving unit 51 is configured to receive a connection request sent by the terminal and the connection request carries terminal operation information.

In an embodiment of the present disclosure, the terminal operation information includes one or any combination of the process information, the code segment hash, the stack feature information, or the application signature information.

In an embodiment of the present disclosure, the process information includes but not limited to the creator, the authority, the debugging information, the opened file and socket list, the process ID, the parent process ID, the assigned user ID, the group ID, the belonged user group list, the owned capacity, capability, list of Android capabilities for APP applications. When the terminal collects process information, it can be performed by, for example, reading the information of /proc/self/status in the Android system or checking whether the parent process ID (PPID) is the desired caller process ID. Receiving the ID of the process tracking the process information (Trace PID) can indicate whether the process is in the debugged state. The user ID (UID) and the group ID can indicate whether the process has been assigned with the appropriate user ID and user group, and the capability of the process (CapEff), etc. can indicate whether the ability acquired by the current process is appropriate.

In the embodiment of the present disclosure, the code segment hash can be obtained by program, for example, obtained by calculating using a hash algorithm for .text segments of all executable files.

In the embodiment of the present disclosure, the stack information may be obtained by following ways. For example, the terminal may, before sending the stack information to the server, set a random number in a local variable in the stack, transmit the address of the random number to the function of collecting the stack, then collect the data, which is stack information, between the stack address of the function and the address of the random number through the function. The random number can be set in a plurality of function stacks existing hierarchical calling relationship. However, the premise of above is that the collection to the function stacks set in the function execution does not end.

The random number may be generated by the terminal or may be the random number sent by the server.

The matching unit 52 is configured to acquire the pre-stored terminal operation information, and to match the terminal operation information with the pre-stored terminal operation information according to a preset matching strategy.

In an embodiment of the present disclosure, the pre-stored terminal operation information is the terminal operation information stored in the authentication database of the server. As the process information collected by different types of terminals is in different modes but the process information of the same type of terminal is basically the same, each type of terminal process information can be entered into the authentication database for storage before the products are shipped. The same type of terminals can be the terminals with the same operating system, the same brand, and the same model.

In an embodiment of the present disclosure, the preset matching strategy is preset by the server system, or may be sent by the strategy server.

In the embodiment of the present disclosure, the preset matching strategy is to match all the received terminal operation information with the preset terminal operation information, or select at least one terminal operation information sent by the terminal to match with the preset terminal operation information.

In the embodiment of the present disclosure, when receiving the terminal operation information sent by the terminal, the server may perform authentication detection between the terminal operation information and the terminal operation information pre-stored in the authentication database by using a regular expression. Specifically, the regular expression is generated according to the terminal operation information pre-stored in the database and the matching rule list is set up according to the rule of the regular expression. the matching of the terminal operation information is sequentially performed according to the order of the fields of the regular expression. When the matching of the fields in the regular expression is successfully, the terminal operation information is detected successfully and the terminal can access legally. Otherwise, the detection fails and the terminal access fails.

In a preferred embodiment of the present disclosure, the terminal can set an authentication code in the stack, and the server protects the memory of the stack according to the distribution of the authentication code, so as to avoid others' unauthorized access by utilizing the available bug of the buffer overflow during authentication phase. Specifically, multiple authentication codes are set in the stack. For example, the authentication codes are set in the function stacks of the hierarchical function call relationship, and the authentication codes in the shallow-level function stack that has not been recovered are traversed by the deep-level function and the address differences between every two random numbers in each function are calculated. According to the calling relationship of the functions reflected by the address differences, as the calling relationship is certain, when one of the functions is attacked, the sum of the random numbers in the function stacks may be destroyed, so the function calling relationship will also be abnormal. Therefore, it can be determined whether it is currently attacked by others or not by detecting whether the function calling relationship is abnormal, thus protection of the stack memory can be realized.

The authentication code may be random number generated by the terminal, or may be random number sent by the server.

The communication establishing unit 53 is configured to send, when the terminal operation information is matched with the pre-stored terminal operation information, the authentication success information to the terminal, and establish communication with the terminal.

In the embodiment of the present disclosure, the server receives the encrypted terminal operation information sent by the terminal, and performs legality detection of the terminal according to the terminal operation information to determine whether to enable the terminal to access. By encrypting the terminal operation information before transmitting it to the server, the security of the terminal operation information during the transmitting process can be ensured, the attack by others can be avoided and the risk of data leakage can be reduced.

Embodiment 6

Figure 7:
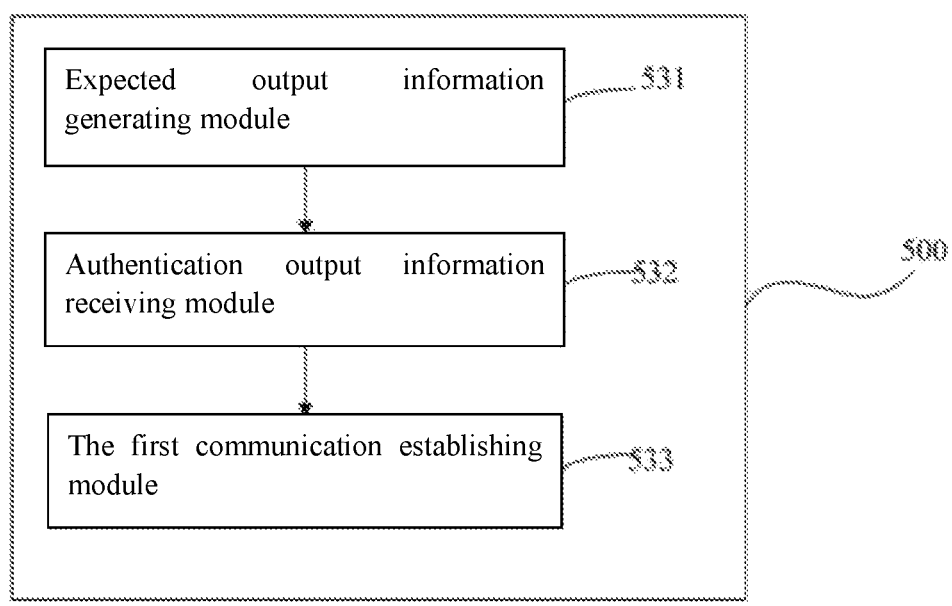
FIG. 7 illustrates a schematic structural diagram of a communication establishing unit according to Embodiment 6 of the present disclosure.

FIG. 7 illustrates a schematic structural diagram of a communication establishing unit 53 according to Embodiment 6 of the present disclosure. For convenience of description, only parts related to this embodiment of the present disclosure are shown.

The communication establishing unit 53 includes: an expected output information generating module 531, an authentication output information receiving module 532 and a first communication establishing module 533.

The expected output information generating module 531 is configured to obtain, when the terminal operation information matches the pre-stored terminal operation information, an authentication command and acquire corresponding expected output information according to the authentication command.

In the embodiment of the present disclosure, after the matching of the terminal operation information sent by the terminal and the pre-stored terminal operation information succeeds, the authentication command is obtained, and corresponding expected output information is acquired according to the authentication command. For example, the authentication command is to generate the current process number, and the server will acquire the expected output information according to the authentication command, such as, the current process number is process number A.

The authentication command can be generated by the server. Alternatively, the server sends the authentication success information to the strategy server after the terminal operation information succeeds and receives the authentication command returned by the strategy server.

In the embodiment of the present disclosure, the authentication command may be to obtain the current process number or the parent process number, or the memory address loaded by the process, and may be specifically set according to actual conditions.

The authentication output information receiving module 532 is configured to send the authentication command and the authentication success information to the terminal, and receive the authentication output information which is generated according to the authentication command and returned by the terminal.

The first communication establishing module 533 is configured to determine whether the authentication output information matches the expected output information, and establish communication with the terminal when the authentication output information matches the expected output information.

In an embodiment of the present disclosure, the expected output information is the corresponding expected output information acquired by the server according to the authentication command when the server sends the authentication command to the terminal. For example, when the authentication command is the current process number, the server obtains the process number in the operation information from the terminal as the expected output information.

In the embodiment of the present disclosure, after the authentication output information is generated according to the authentication command sent by the server, the authentication output information is sent to the server by the terminal, so that the server performs matching on the expected output information according to the authentication output information. If the matching is successful, the terminal is legal, in this case, the server can be accessed. For example, the authentication command is the current process number, the authentication output information generated by the terminal is the process number A, and the expected output information acquired by the sever is also the process number A, then the authentication output information is consistent with the expected output information and the terminal could access to the server.

Embodiment 7

Figure 8:
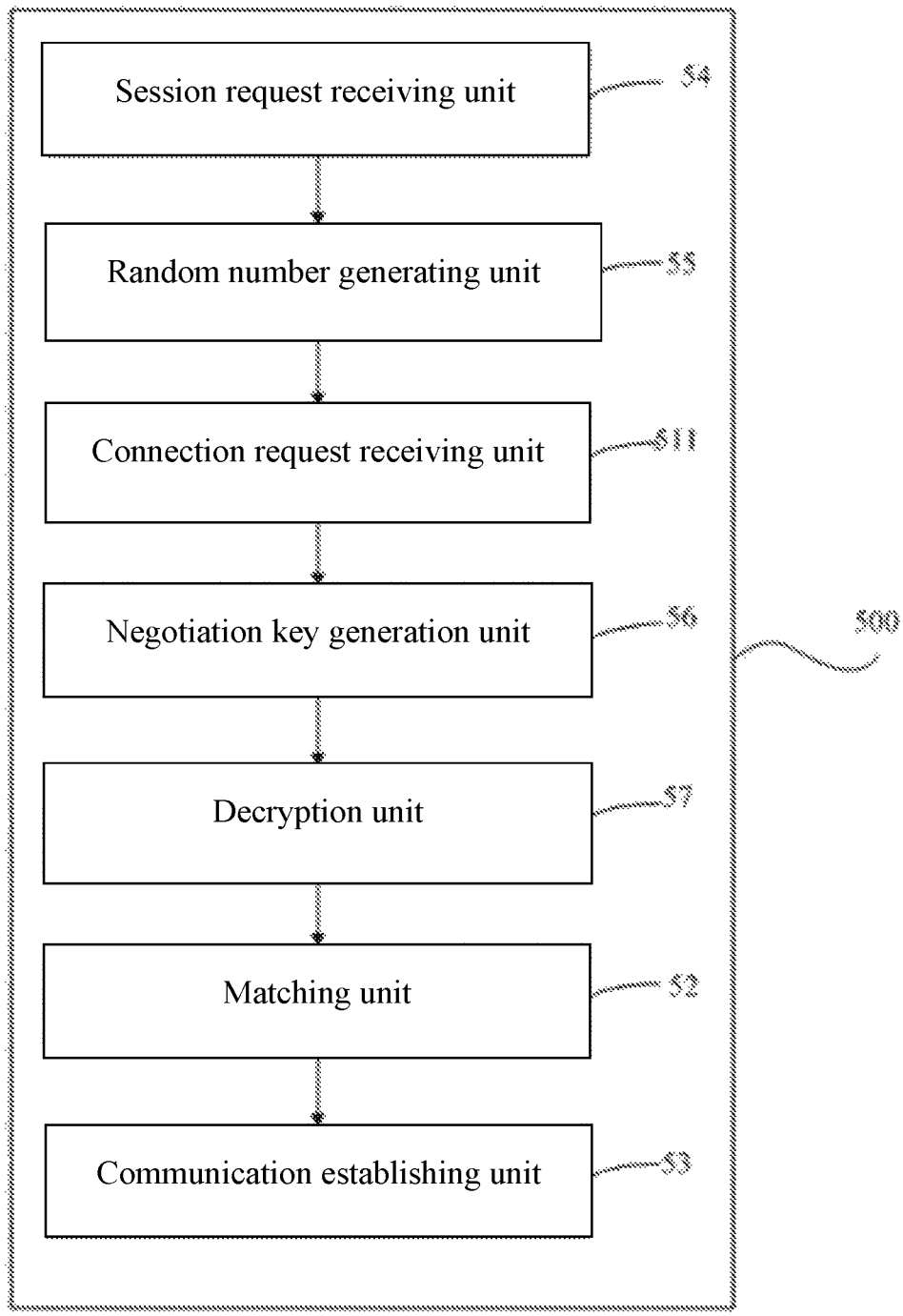
FIG. 8 illustrates a schematic structural diagram of the device for authenticating an accessing terminal according to Embodiment 7 of the present disclosure.

FIG. 8 illustrates a schematic structural diagram of the device for authenticating an access terminal by a server according to Embodiment 7 of the present disclosure. For convenience of description, only parts related to the embodiment of the present disclosure are shown.

The device 500 for authenticating an accessing terminal by a server further includes: a session request receiving unit 54 and a random number generating unit 65.

The session request receiving unit 54 is configured to receive a session request sent by the terminal.

The random number generating unit 65 is configured to generate and send a random number to the terminal, so that the terminal generates a corresponding negotiation key according to the random number.

In an embodiment of the present disclosure, when receiving the session request sent by the terminal, the server is triggered to generate a corresponding random number according to the random number generation algorithm and send the corresponding random number to the terminal for generating the negotiation key. The random number generation algorithm may include a plurality of ways, for example, could be Math.random( ), and s could be set according to actual conditions, which is not limited by the present disclosure.

In the embodiment of the present disclosure, the negotiation key can be obtained by the following calculation method: the negotiation key ka=f (random number, IMEI), where IMEI is the international mobile equipment identity, which is the unique code to identify the same terminal device, and f is computational relationship, which can be set according to the actual situation. Based on the negotiation key agreement, negotiation key ka may be obtained through the random number sent by the server, the unique identification code, IMEI, of the terminal device, by the above algorithm formula, using the calculation with two inputs, like "and", "or", etc. The negotiation key agreement can be the Internet Key Exchange Agreement, or IKE for short.

Further, the negotiation key ka can alternatively be calculated by other algorithms, which is not limited in the embodiment of the present disclosure.

The connection request receiving unit 51 includes a connection request receiving module 511.

The connection request receiving module 511 is configured to receive a connection request sent by the terminal, the connection request carrying terminal operation information encrypted by the negotiation key.

In an embodiment of the present disclosure, the server receives the connection request sent by the terminal, the connection request carrying the terminal operation information, and the server detects, by using a preset matching strategy, whether the terminal operation information of the terminal matches the pre-stored terminal operation information. When the terminal operation information matches the pre-stored terminal operation information, the terminal is allowed to access to communicate with the server. Since the terminal operation information is not easy to be read and modified, the access of a host program that forged the legitimate communication data can effectively be avoided by detecting terminal operation information, which is very safe and reliable. Further, as the terminal operation information is detected by using a preset matching strategy, the legitimacy of the terminal can be detected in various aspects, which has pertinence, the reliability is higher, and data leakage risk can be avoided.

In the embodiment of the present disclosure, the device 500 for authenticating the accessing terminal by the server further includes a negotiation key generation unit 56 and a decryption unit 57.

The negotiation key generation unit 56 is configured to generate the negotiation key according to the random number. In the embodiment of the present disclosure, the negotiation key can be obtained by the following calculation method: the negotiation key ka=f (random number, IMEI), where IMEI is the international mobile equipment identity, which is the unique code to identify the same terminal device, and f is computational relationship, which can be set according to the actual situation. Based on the negotiation key agreement, negotiation key ka may be obtained through the random number sent by the server, the unique identification code, IMEI, of the terminal device, by the above algorithm formula, using the calculation with two inputs, like "and", "or", etc. The negotiation key agreement can be the Internet Key Exchange Agreement, or IKE for short.

Further, the negotiation key ka can alternatively be calculated by other algorithms, which is not limited in the embodiment of the present disclosure.

The decryption unit 57 is configured to decrypt the encrypted terminal operation information according to the negotiation key.

In the embodiment of the present disclosure, after the server generates the random number, a negotiation key is generated according to the random number, and the negotiation key corresponds to the negotiation key generated by the terminal. When receiving the terminal operation information encrypted by the negotiation key and sent by terminal, the server decrypts the terminal operation information according to the generated negotiation key to obtain the decrypted terminal operation information.

Embodiment 8

Figure 9:
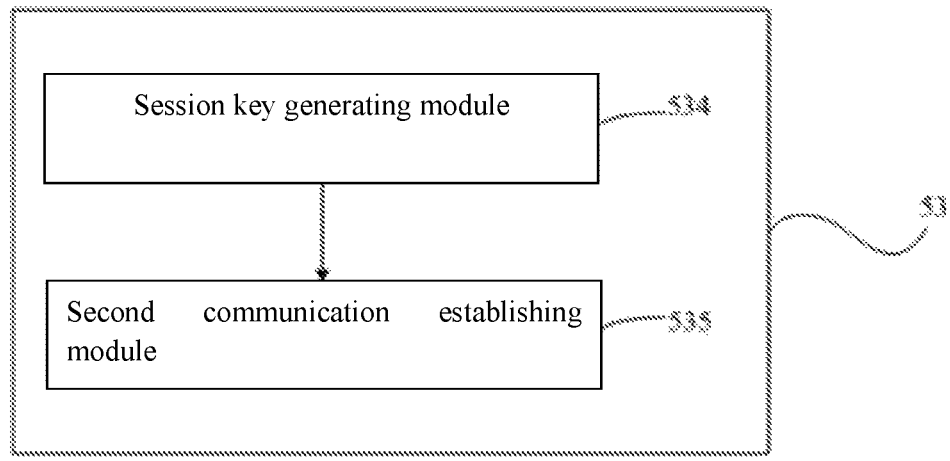
FIG. 9 illustrates a schematic structural diagram of a communication establishing unit according to Embodiment 8 of the present disclosure.

FIG. 9 illustrates a schematic structural diagram of a communication establishing unit according to Embodiment 8 of the present disclosure. For convenience of description, only parts related to this embodiment of the present disclosure are shown.

The communication establishing unit 53 includes a session key generating module 534 and a second communication establishing module 635.

The session key generating module 534 is to generate a session key when the terminal operation information matches the pre-stored terminal operation information.

In an embodiment of the present disclosure, when the server matches the pre-stored terminal operation information with the terminal operation information sent by the terminal through a preset matching strategy, the session key may be generated, and the session key is encrypted by the negotiation key. The terminal receives the encrypted session key and decrypts it by negotiation key. When the communication is made with the server, it can be encrypted by the session key to ensure safety. The session key can be derived from cluttered signal values using the CryptDeriveKey function.

In an embodiment of the disclosure, the session key may alternatively be replaced directly by the negotiation key.

The second communication establishing module 535 is configured to send the authentication success information and the session key to the terminal to establish a connection with the terminal, and to perform a session with the terminal through the session key.

In an embodiment of the present disclosure, in order to ensure the security of the session key in the transmission process, the session key may be encrypted by using the negotiation key, and when receives the session key, the terminal may decrypt the session key by negotiation key so that the session key could be used to encrypt the session of the communication process.

In an embodiment of the present disclosure, the server receives the connection request which carries terminal operation information and is sent by the terminal, and the server detects, by using a preset matching strategy, whether the terminal operation information of the terminal matches the pre-stored terminal operation information, and allows, when the terminal operation information matches the pre-stored terminal operation information, the terminal to access so as to communicate with the server. Since the terminal operation information is not easy to be read and modified, the access of a host program that forged the legitimate communication data can effectively be avoided by detecting terminal operation information, which is very safe and reliable. Further, as the terminal operation information is detected by using a preset matching strategy, the legitimacy of the terminal can be detected in various aspects, which has pertinence, the reliability is higher, and data leakage risk can be avoided.

Embodiment 10

Figure 10:
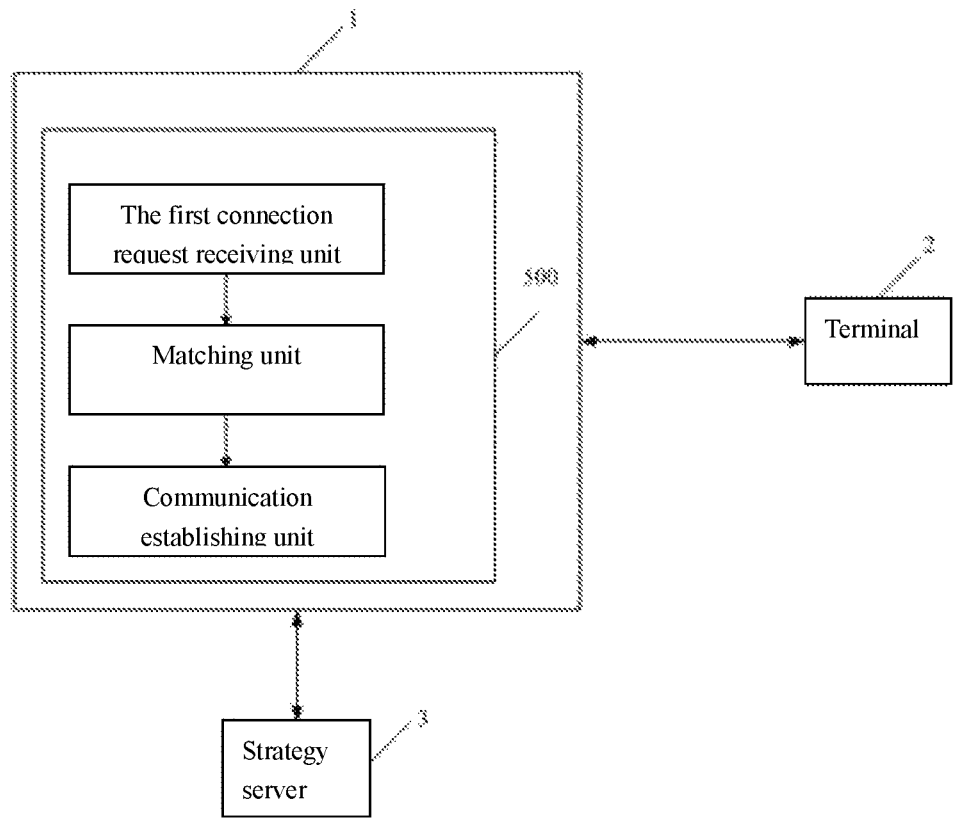
FIG. 10 illustrates a schematic structural diagram of a system for authenticating an accessing terminal by a server according to Embodiment 9 of the present disclosure.

FIG. 10 illustrates a schematic structural diagram of a system for authenticating an accessing terminal by a server according to an embodiment of the present disclosure. For convenience of description, only parts related to this embodiment of the present disclosure are shown.

The terminal 1 is configured to obtain terminal operation information and send the terminal operation information to the server 2.

The server 2 is configured to receive terminal operation information sent by the terminal 2 and perform legality authentication on the terminal 1 according to the terminal operation information.

a connection request receiving unit 51, configured to receive a connection request sent by the terminal, the connection request carrying terminal operation information;

a matching unit 52, configured to obtain the pre-stored terminal operation information, and match the terminal operation information with the pre-stored terminal operation information according to a preset matching strategy;

a communication establishing unit 53, configured to send, when the terminal operation information is matched with the pre-stored terminal operation information, the authentication success information to the terminal, and establish communication with the terminal. For a specific embodiment of the server 2, reference could be made to the embodiment of the above device for authenticating an accessing terminal by a server, which will not be described in detail herein again.

In the embodiment of the present disclosure, the authentication system further includes:

a security strategy server 3, configured to provide a matching strategy to the server 2 so that the server 2 matches the terminal operation information according to the matching strategy.

The embodiment of the present disclosure further provides a server, which includes a processor and a memory. The processor is configured to implement, when executing the computer program stored in the memory, the steps of the method for authenticating the accessing terminal by the server, provided by the above embodiments of the disclosure.

The embodiment of the present disclosure further provides a computer readable storage medium with the computer program (instruction) stored thereon, and when the computer program (instruction) is executed by the processor steps of method for authenticating an accessing terminal by a server, provided by the above embodiments of the present disclosure embodiment, are implemented.

Figure 11:
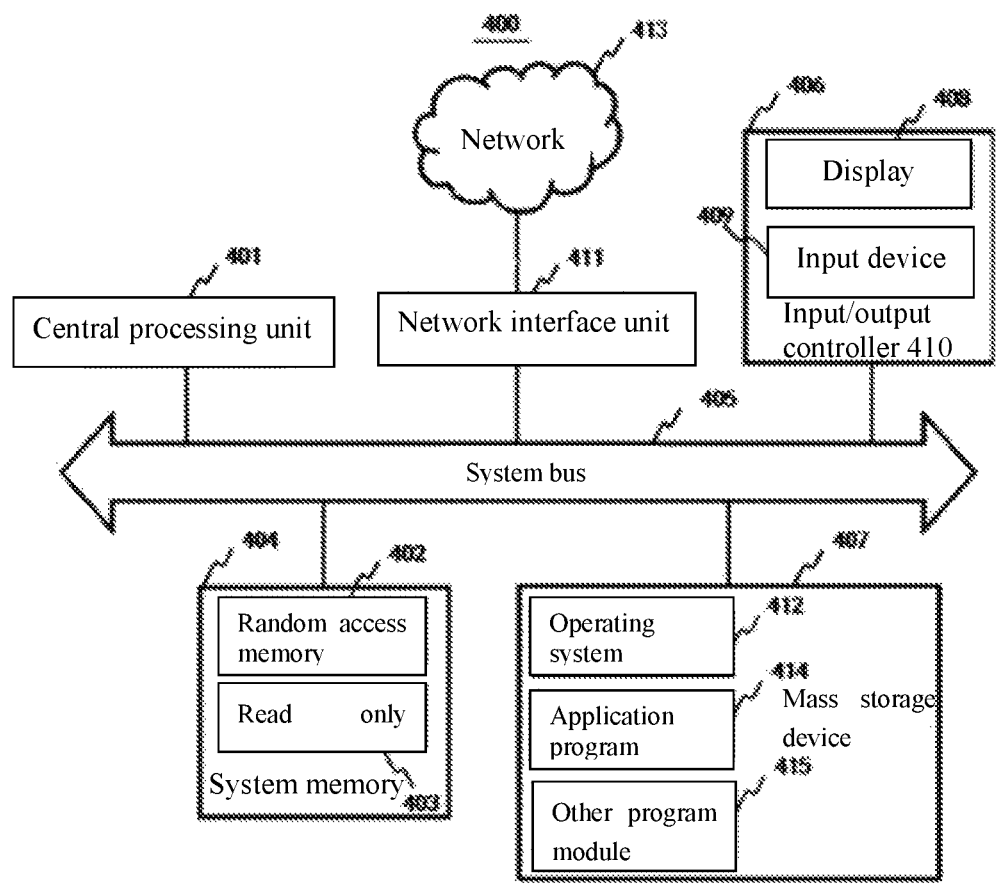
FIG. 11 illustrates a schematic structural diagram of a server according to an embodiment of the present disclosure.

FIG. 11 illustrates a schematic structural diagram of a server according to an embodiment of the present disclosure.

The server 400 can use this structure to implement the method for authenticating an accessing terminal by a server, provided by the above embodiments.

The server 400 includes a central processing unit (CPU) 401, a system memory 404 including a random access memory (RAM) 402 and a read only memory (ROM) 403, and a system bus 405 that connects the system memory 404 and the central processing unit 401. Server 400 also includes a basic input/output system (I/O system) 406 that facilitates information transferring between various devices within the computer and a mass storage device 407 for storing operating system 412, application program 414, and other program module 415.

The basic I/O system 406 includes a display 408 for displaying information and an input device 409, such as a mouse, keyboard or the like for inputting information by user. Both display 408 and input device 409 are connected to central processing unit 401 via an input/output controller 410 connected to system bus 405. The basic I/O system 406 can also include the input/output controller 410 for receiving and processing input from a plurality of other devices, such as a keyboard, mouse, or electronic stylus. Similarly, the input/output controller 410 also provides output to a display screen, printer or other type of output device.

The mass storage device 407 is connected to the central processing unit 401 by a mass storage controller (not shown) connected to the system bus 405. The mass storage device 407 and its associated computer readable medium provide non-volatile storage for the server 400. That is, the mass storage device 407 can include the computer readable medium (not shown) such as a hard disk or a CD-ROM drive.

Without loss of generality, computer readable medium may include computer storage medium and communication medium. Computer storage medium includes volatile/non-volatile, removable/non-removable medium implemented in any method or technology for storage of information such as computer readable instructions, data structures, program modules or other data. Computer storage media include RAM, ROM, EPROM, EEPROM, flash memory or other solid-state storage technologies, CD-ROM, DVD or other optical storage, tape cartridge, magnetic tape, magnetic disk storage or other magnetic storage devices. Of course, those skilled in the art will know that the computer storage medium is not limited to the above. The system memory 404 and mass storage device 407 described above may be collectively referred to as a memory.

According to various embodiments of the present disclosure, the server 400 can also be operated by a remote computer connected to the network through a network such as the Internet. That is, the server 400 can be connected to the network 413 through a network interface unit 411 connected to the system bus 405, or be connected to other types of networks or remote computer systems (not shown) by using the network interface unit 411.

The memory also includes one or more programs stored in the memory, which is configured to be executed by one or more central processing units 401. The above one or more programs include methods for performing authentication of access terminals by server as illustrated in FIGS. 2, 3, 4, and 5.

A person skilled in the art can understand all or part of the steps of the above embodiments could be completed by hardware, or by instructing related hardware with a program. The program may be stored in a computer readable storage medium. The storage medium as mentioned above could be a read only memory, a magnetic disk or an optical disk etc.

Figure 12:
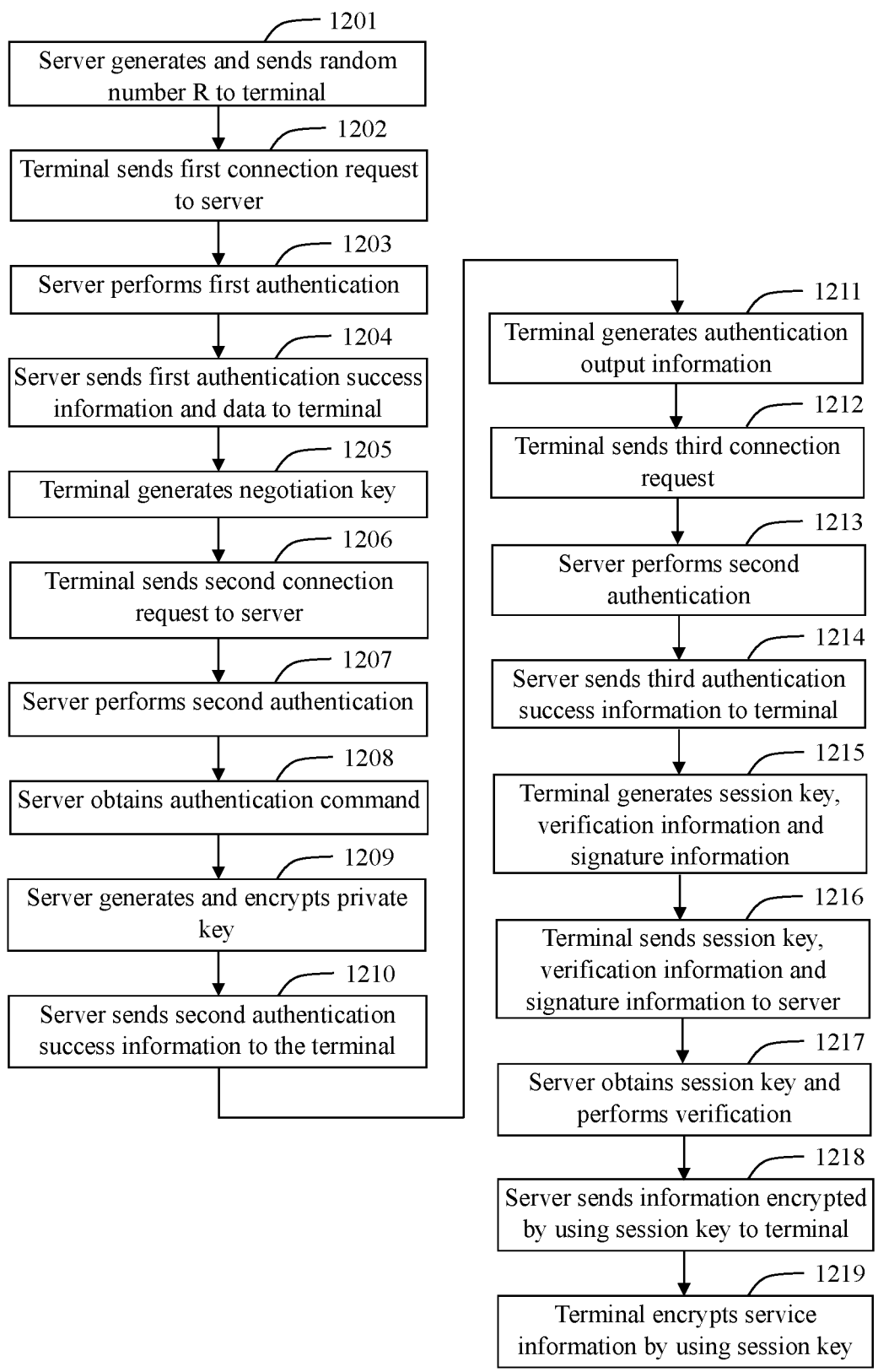
FIG. 12 is a flowchart of an implementation of a method for authenticating an access terminal according to another embodiment of the present invention.

FIG. 12 is a flowchart of an implementation of a method for authenticating an access terminal according to another embodiment of the present invention.

In S1201, the server generates a random number R and sends it to the terminal. The server may generate the random number R after receiving the session request sent by the terminal.

In S1202, the terminal sends a first connection request to the server. The first connection request may carry device information of the terminal, which may include part or all of an IMEI, device type and device code.

In S1203, the server performs first authentication on the accessing terminal according to the device information, and if the first authentication passes, authentication data is generated, and S1204 will be performed.

In this embodiment, the first authentication may be a determination of whether the accessing terminal is a product belonging to a specific vendor. The authentication data may include part or all of a piece of executable code corresponding to the accessing terminal and selected according to the device information, at least one generated parameter of the executable code, an execution result Ckey obtained by executing the executable code, the generated key calculation data Dkey and initial data for calculating the hash.

In S1204, the server sends the first authentication success information and the executable code, the key calculation data Dkey, and the initial data for calculating the hash to the terminal.

In S1205, the terminal generates a corresponding negotiation key ka according to the random number R and the key calculation data Dkey.

In this embodiment of the present disclosure, the negotiation key ka can be obtained by the following calculation method: ka=f (R, Dkey), where R is a random number, Dkey is key calculation data, and f is an operation relationship, which can be set based on actual conditions.

In S1206, the terminal sends a second connection request to the server, where the second connection request carries terminal operation information encrypted by using the negotiation key ka.

In this embodiment of the present disclosure, the terminal operation information may include one of the process information, the code segment hash, the stack feature information, and the application signature information, or any combination thereof.

In S1207, the server performs second authentication by using the terminal operation information sent by the terminal. Specifically, the server can obtain the pre-stored terminal operation information, and match the terminal operation information in the second connection request with the pre-stored terminal operation information according to the preset matching strategy.

It can be understood that the server can generate a negotiation key according to the formula ka=f (R, key), and decrypt the encrypted terminal operation information in the second connection request by using the generated negotiation key, and perform the match with the pre-stored terminal operation information.

In S1208, when determining that the terminal operation information in the second connection request matches the pre-stored terminal operation information, the server obtains an authentication command, and acquires corresponding expected output information according to the authentication command.

In S1209, the server generates a private key PKey, and encrypts the private key PKey by using CKey to obtain an encrypted private key PKey'.

In S1210, the server sends the authentication command and the second authentication success information to the terminal, where the encrypted private key PKey' is carried. It can be understood that what sent by the server may be the authentication command and the encrypted private key PKey' which are encrypted by using the negotiation key ka.

In S1211, the terminal generates the authentication output information according to the authentication command. It can be understood that the terminal can decrypt the authentication command by using the negotiation key ka to generate the authentication output information.

In S1212, the terminal sends a third connection request and the generated authentication output information to the server. It can be understood that the server may send the authentication output information encrypted by using the negotiation key ka.

In S1213, the server performs third authentication on the accessing terminal by using the authentication output information sent by the terminal. Specifically, the server may determine whether the authentication output information sent by the terminal matches the acquired expected output information.

In S1214, when determining that the authentication output information is consistent with the expected output information, the server sends a third authentication success information and the generated at least one parameter of the executable code to the terminal. It may be understood that what the server send may be the parameter of the executable code encrypted by using the negotiation key ka.

In S1215, the terminal executes the executable code by using the at least one parameter of the executable code, obtains an execution result Ckey of the executable code, and decrypts the encrypted private key PKey' by using the obtained Ckey to obtain the private key PKey, and uses the private key PKey to sign the specified content. Moreover, the session key of the current connection is generated, the session key is encrypted by using the preset public key, and specified verification information is encrypted by using the session key.

In S1216, the terminal sends the session key encrypted by using the preset public key, the verification information encrypted by using the session key, and the information signed by using the private key to the server.

In S1217, the server decrypts the received encrypted session key by using the preset private key to obtain the decrypted session key, decrypts the received encrypted verification information by using the session key, and decrypts the received encrypted signature by using the public key. The server further verifies the decrypted verification information and the decrypted signature information and if the verification is passed, S1218 is executed.

In S1218, the server sends information encrypted by using the session key to the terminal, so as to establish communication with the terminal.

In S1219, the terminal encrypts the service information by using the session key.

The above are only some preferred embodiments of the present disclosure, however, they are not intended to limit the present disclosure. Any modification, equivalent substitution and improvement made within the spirit and principle of the present disclosure should be within the protection scope of the present disclosure.

What is claimed is:

1. A method for authenticating an accessing terminal, which is applied to a server, wherein the method comprises:
receiving a connection request sent by the terminal, the connection request carrying first terminal operation information;
obtaining pre-stored second terminal operation information, and matching the first terminal operation information with the pre-stored second terminal operation information according to a preset matching strategy;
sending, when the first terminal operation information matches the pre-stored second terminal operation information, authentication success information to the terminal so as to establish communication with the terminal; and wherein said sending, when the first terminal operation information matches the pre-stored second terminal operation information, authentication success information to the terminal, and establishing communication with the terminal comprises:
obtaining, when first the terminal operation information matches the pre-stored second terminal operation information, an authentication command and acquiring corresponding expected output information according to the authentication command;
sending the authentication command and the authentication success information to the terminal and receiving the authentication output information which is generated according to the authentication command and returned by the terminal; and
determining whether the authentication output information matches the expected output information, and establishing communication with the terminal when the matching is consistent.

2. The method for authenticating an accessing terminal according to claim 1, wherein, before said receiving a connection request sent by the terminal, the connection request carrying first terminal operation information, the method further comprises:
receiving a session request sent by the terminal; and
generating and sending a random number to the terminal, so that the terminal generates a corresponding negotiation key according to the random number; said receiving a connection request sent by the terminal, the connection request carrying first terminal operation information comprises:
receiving a connection request sent by the terminal, the connection request carrying first terminal operation information encrypted by the negotiation key.

3. The method for authenticating an accessing terminal according to claim 2, wherein, before said obtaining pre-stored second terminal operation information, and matching the first terminal operation information with the pre-stored second terminal operation information according to a preset matching strategy, the method further comprises:
generating the negotiation key according to the random number; and
decrypting the encrypted first terminal operation information according to the negotiation key.

4. The method for authenticating an accessing terminal according to claim 1, wherein, said sending, when the first terminal operation information matches the pre-stored second terminal operation information, authentication success information to the terminal and establishing communication with the terminal further comprises:
generating a session key when the first terminal operation information matches the pre-stored second terminal operation information; and
sending the authentication success information and the session key to the terminal to establish a connection with the terminal, and performing a session with the terminal through the session key.

5. The method for authenticating an accessing terminal according to claim 1, wherein, the first terminal operation information comprises one or any combination of process information, code segment hash, stack feature information and application signature information.

6. The method for authenticating an accessing terminal according to claim 1, wherein, before said receiving a connection request sent by the terminal, the method further comprises:
executing an executable code to obtain an execution result; and
sending the executable code to the terminal.

7. The method for authenticating an accessing terminal according to claim 1, wherein,
before said receiving a connection request sent by the terminal, the method further comprises:
executing an executable code to obtain an execution result; and
sending the executable code to the terminal; when the first terminal operation information is consistent with the pre-stored second terminal operation information, the method further includes:
generating a private key;

encrypting the private key by using the execution result; and sending the encrypted private key to the terminal; and after determining that the authentication output information matches the expected output information, the method further includes:

transmitting a parameter of the executable code to the terminal so that the terminal executes the executable code to obtain the execution result and decrypted the encrypted private key by using the obtained execution result.

8. The method for authenticating an accessing terminal according to claim 1, wherein, after determining that the authentication output information matches the expected output information, the method further includes:

receiving, from the terminal, a session key and signature information obtained by signing a specified content by using a private key; and said sending authentication success information to the terminal so as to establish communication with the terminal comprising:

verifying the signature information; and sending information encrypted by using the session key to the terminal when the verification is passed, so at to establish communication with the terminal.

9. The method for authenticating an accessing terminal according to claim 7, wherein, after determining that the authentication output information matches the expected output information, the method further includes:

receiving, from the terminal, a session key and signature information obtained by signing a specified content by using the private key; and said sending authentication success information to the terminal so as to establish communication with the terminal comprising:

verifying the signature information; and sending information encrypted by using the session key to the terminal when the verification is passed, so at to establish communication with the terminal.

10. A device for authenticating an accessing terminal, comprising a central processing unit and a computer readable storage medium storing one or more programs, the one or more programs are configured to, when executed by the central processing unit, cause the device to perform following steps of a method for authenticating an accessing terminal:

receiving a connection request sent by the terminal, the connection request carrying first terminal operation information;

obtaining pre-stored second terminal operation information, and matching the terminal operation information with the pre-stored second terminal operation information according to a preset matching strategy; and sending, when the first terminal operation information matches the pre-stored second terminal operation information, authentication success information to the terminal so as to establish communication with the terminal; and wherein, said sending, when the first terminal operation information matches the pre-stored second terminal operation information, authentication success information to the terminal, and establishing communication with the terminal comprises:

obtaining, when the first terminal operation information matches the pre-stored second terminal operation information, an authentication command and acquiring corresponding expected output information according to the authentication command;

sending the authentication command and the authentication success information to the terminal, and receiving the authentication output information which is generated according to the authentication command and returned by the terminal; and determining whether the authentication output information matches the expected output information, and establishing communication with the terminal when the matching is consistent.

11. The device for authenticating an accessing terminal according to claim 10, wherein before said receiving a connection request sent by the terminal, the connection request carrying first terminal operation information, the method further comprises:

receiving a session request sent by the terminal; and generating and sending a random number to the terminal, so that the terminal generates a corresponding negotiation key according to the random number;

said receiving a connection request sent by the terminal, the connection request carrying first terminal operation information comprises:

receiving a connection request sent by the terminal, wherein the connection request carries first terminal operation information encrypted by the negotiation key.

12. The device for authenticating an accessing terminal according to claim 11, wherein before said obtaining pre-stored second terminal operation information, and matching the first terminal operation information with the pre-stored second terminal operation information according to a preset matching strategy, the method further comprises:

generating the negotiation key according to the random number; and decrypting the encrypted first terminal operation information according to the negotiation key.

13. The device for authenticating an accessing terminal according to claim 10, wherein said sending, when the first terminal operation information matches the pre-stored second terminal operation information, authentication success information to the terminal and establishing communication with the terminal further comprises:

generating a session key when the first terminal operation information matches the pre-stored second terminal operation information; and sending the authentication success information and the session key to the terminal to establish a connection with the terminal, and performing a session with the terminal through the session key.

14. The device for authenticating an accessing terminal according to claim 10, wherein the first terminal operation information comprises one or any combination of process information, code segment hash, stack feature information or application signature information.

15. An authentication system, comprising:

a terminal device, configured to send a connection request to a server, the connection request carrying the first terminal operation information; and the server comprising at least a memory and configured to receive and compare the first terminal operation information to a second pre-stored terminal operation according to a preset matching strategy to establish an authentication command and authentication success information and an expected output information when there is a match between the first terminal operation information and the second pre-stored terminal operation, and further configured to send the authentication command and authentication success information to the terminal and to receive in return authentication output information from the terminal which is compared to the expected output information and, if a match is made between the authentication output information and the expected output information, to establish a communication with the terminal.

16. The authentication system according to claim 15, wherein the authentication system further comprises:
a security strategy server, configured to provide a matching strategy to the server so that the server matches the first and second terminal operation information according to the matching strategy.

* * * * *